(12) United States Patent
Cooke

(10) Patent No.: US 10,469,467 B2
(45) Date of Patent: Nov. 5, 2019

(54) EMAIL ATTACHMENT SECURITY SYSTEM AND METHOD USING OUT-OF-BAND AUTHENTICATION

(71) Applicant: Trustifi, LLC, Las Vegas, NV (US)

(72) Inventor: Jean-Luc Cooke, Ottawa (CA)

(73) Assignee: Trustifi, LLC, Las Vegas, NV (US)

( * ) Notice: Subject to any disclaimer, the term of this patent is extended or adjusted under 35 U.S.C. 154(b) by 62 days.

(21) Appl. No.: 15/754,552

(22) PCT Filed: Aug. 26, 2016

(86) PCT No.: PCT/US2016/049044
§ 371 (c)(1),
(2) Date: Feb. 22, 2018

(87) PCT Pub. No.: WO2017/035486
PCT Pub. Date: Mar. 2, 2017

(65) Prior Publication Data
US 2018/0288018 A1    Oct. 4, 2018

Related U.S. Application Data

(60) Provisional application No. 62/210,389, filed on Aug. 26, 2015.

(51) Int. Cl.
*H04L 29/06*      (2006.01)
*G06F 15/16*      (2006.01)
(Continued)

(52) U.S. Cl.
CPC .......... *H04L 63/0471* (2013.01); *G06F 15/16* (2013.01); *G06F 21/42* (2013.01);
(Continued)

(58) Field of Classification Search
CPC ............. H04L 63/0428; H04L 63/0471; H04L 63/061; H04L 63/083; H04L 63/0853;
(Continued)

(56) References Cited

U.S. PATENT DOCUMENTS

2002/0091928 A1   7/2002   Bouchard et al.
2007/0036296 A1   2/2007   Flanagan et al.
(Continued)

OTHER PUBLICATIONS

International Search Report and Written Opinion for PCT/US2016/049044, dated Nov. 3, 2016.

*Primary Examiner* — Jeffrey C Pwu
*Assistant Examiner* — Thong P Truong
(74) *Attorney, Agent, or Firm* — Knobbe, Martens, Olson & Bear, LLP

(57) ABSTRACT

The email attachment security system and method using out-of-band authentication allows a recipient to receive a secure digital file from a sender. The system server receives from the sender a send request, a digital file with a recipient's email address and phone number. The system server encrypts the digital file and sends an email to the recipient with a clickable link that, when clicked, initiates the out-of-band authentication by opening a customized webpage requesting the recipient verify the sender-provided recipient phone number. After verification, an authentication PIN is forwarded to the recipient's telephone via voice or text message. This authentication PIN is input at the customized webpage by the recipient to complete the authentication. Then the encrypted digital file (attached to the email in the first aspect) is decrypted and access to the digital file is provided to the authenticated recipient.

14 Claims, 4 Drawing Sheets

(51) Int. Cl.
  *H04L 12/58*    (2006.01)
  *H04L 9/08*     (2006.01)
  *H04L 9/06*     (2006.01)
  *G06F 21/42*    (2013.01)

(52) U.S. Cl.
  CPC .......... *H04L 9/0643* (2013.01); *H04L 9/0827* (2013.01); *H04L 9/0894* (2013.01); *H04L 51/10* (2013.01); *H04L 51/12* (2013.01); *H04L 51/22* (2013.01); *H04L 63/0428* (2013.01); *H04L 63/061* (2013.01); *H04L 63/083* (2013.01); *H04L 63/0853* (2013.01); *H04L 63/18* (2013.01); *H04L 2463/082* (2013.01); *H04L 2463/121* (2013.01)

(58) Field of Classification Search
  CPC ..... H04L 63/18; H04L 9/0643; H04L 9/0827; H04L 9/0894; G06F 21/42
  See application file for complete search history.

(56) References Cited

U.S. PATENT DOCUMENTS

| | | |
|---|---|---|
| 2007/0258584 A1 | 11/2007 | Brown et al. |
| 2010/0217969 A1 | 8/2010 | Tomkow |
| 2010/0325005 A1 | 12/2010 | Benisti et al. |
| 2012/0124651 A1 | 5/2012 | Ganesan et al. |
| 2012/0272056 A1* | 10/2012 | Ganesan ............ H04L 63/0838 713/156 |
| 2014/0173284 A1 | 6/2014 | Ganesan |

* cited by examiner

EMAIL ATTACHMENT SECURITY SYSTEM AND METHOD USING OUT-OF-BAND AUTHENTICATION

CROSS-REFERENCE TO RELATED APPLICATIONS

This application is the U.S. National Phase Application under 35 U.S.C. § 371 of International Application No. PCT/US2016/049044, filed Aug. 26, 2016, which claims the benefit of U.S. Provisional Patent Application No. 62/210389, filed Aug. 26, 2015, the disclosures of which are hereby incorporated herein by reference in their entirety.

FIELD OF INVENTION

This invention relates generally to security arrangements for protecting digital file data against unauthorized activity, wherein access to the digital file data is dependent upon cryptographically processed data for personal verification, including a device that produces a personal identification number.

BACKGROUND OF THE INVENTION

Email has become the preferred means of delivery of information to and from businesses and individuals. Yet, security of email transmissions remains problematic. For example, businesses may desire to deliver account statements, financial reports, medical information, transaction materials, legal documents, and other private data via email to reduce cost, to speed transmission, and for other business reasons. However, privacy concerns, HIPAA regulations, and good business practices necessitate that care must be taken to provide secure and confidential transmission of these files or attachments to the proper recipient.

Various systems and methods of email transmission have been proposed, are in use, and may be adequate for some needs. Some of these systems have minimal security. For instance, a password may be sent in the clear in one email and the private data may be sent encrypted in a second email; the password from the first email is then used to decrypt the private data. Or information on how to generate a password (for instance, "use your birth year followed by your zip code as your password") may be sent in an email to enable the recipient to self-generate a password to decrypt an attachment. Others of these systems are cumbersome to install and to keep operational or the authentication method required may be unhandy or burdensome to use.

There is a need for a system and method that is convenient for both the sender and the recipient to use, while providing the recipient secure and confidential access to an unencrypted digital file.

BRIEF SUMMARY OF THE INVENTION

The email attachment security system and method using out-of-band authentication of the present invention allows a recipient to access a secure digital file from a sender after an out of band (OOB) authentication. The system includes one or more system servers including at least one hardware processor, at least one database, and at least one memory operatively coupled to the processor, with the memory storing program instructions that are executed by the processor to perform the OOB authentication and to securely and conveniently provide a digital file designated for a particular user to the particular user. The system server(s) is configured (e.g., designed, programmed, and/or constructed) to receive (preferably through a secure connection) sender-provided data from the sender. The sender-provided data include a recipient-specific digital file to be securely received by the particular recipient, the particular recipient's email address, and the particular recipient's phone number. The system server is configured to encrypt the digital file and send an email (with the encrypted digital file sent as an email attachment in the preferred first aspect of the invention) to the recipient with a clickable link that, when clicked, initiates the out-of-band authentication by opening a customized webpage (customized for the particular recipient), preferably utilizing a secure connection. Upon verification by the particular recipient of the particular recipient's phone number (his or her own phone number), the system server is configured to forward an authentication PIN to the recipient's telephone via a voice or text message. The received authentication PIN is entered by the recipient at the customized webpage to complete the authentication. Upon authentication, the system server is configured to decrypt the encrypted digital file and provide access to the decrypted digital file to the recipient.

The sender accesses this OOB system via a sender's network device, such as through a web portal, through installed software on a computing device, through a mobile phone application, or through bulk data input into the system server. This system is easy for the sender to use, because it only requires the recipient-specific digital file along with the particular recipient's phone number and email address. No installation of software or a mobile application is needed if the sender accesses the web portal. Or, for example, in the situation in which a bulk sender (such as a bank sending monthly account statements) provides bulk data, the bulk sender may send a delimited text file encrypted by a standard encryption protocol, such as PGP or GPG, via a file transfer protocol, preferably using a secure file transfer protocol, such as SFTP is used. The system server then loads the bulk data into the system database.

The system provides secure and confidential transmission to the proper recipient by requiring OOB authentication of the recipient before the decrypted form of the original digital file is provided to the recipient, which in the preferred aspect is done by decrypting the encrypted email attachment. This OOB authentication includes both a possession factor and knowledge factors. The possession factor (sometimes referred to as "something only the user has") requires the recipient to have his/her phone in his/her possession to receive a recipient authentication PIN. The knowledge factors include requiring the particular recipient to know the particular recipient's phone number provided by the sender and requiring the recipient to input the recipient authentication PIN received via a text or voice message sent to that phone number. The OOB authentication verifies that the recipient has access to the recipient's email, knows the recipient phone number designated by the sender, and has possession of the recipient's phone.

Therefore, this system and method is convenient for both the sender and the recipient to use, while providing secure and confidential transmission of the digital file to the proper recipient.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Figure 1:
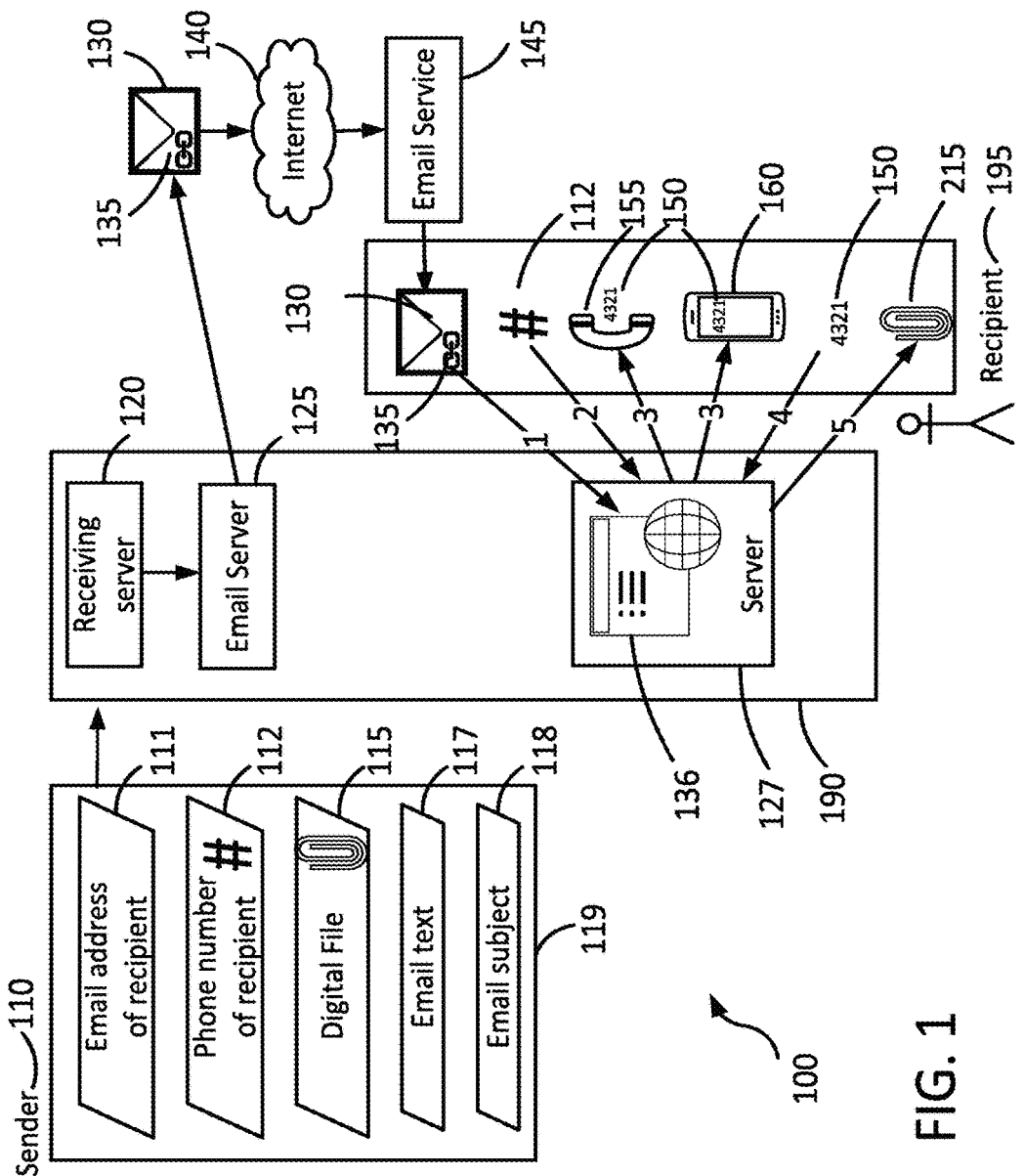
FIG. 1 is a block diagram illustrating the user experience when using the email attachment security system and method using out-of-band authentication of the present invention.

Various embodiments are described hereinafter with reference to the figures. Elements of similar structures or functions are represented by like reference numerals throughout the figures. The figures are not drawn to scale. They are only intended to facilitate the description of specific embodiments and are not intended as an exhaustive description of the invention or as a limitation on the scope of the invention. An illustrated embodiment may not show all aspects or advantages. An aspect or an advantage described in conjunction with a particular embodiment is not necessarily limited to that embodiment and can be practiced in any other embodiments, even if not so illustrated or described. The invention illustratively disclosed herein may be suitably practiced in the absence of any element which is not specifically disclosed herein.

DETAILED DESCRIPTION OF THE INVENTION

The email attachment security system and method using out-of-band (OOB) authentication of the. present invention provides a secure method to send one or more digital files provided by a sender to a recipient. The digital file(s) is encrypted and attached to an email sent to the recipient by the system, with the decryption of the digital file locked to the phone number of the recipient. In the first aspect, the encrypted digital file is sent attached to the email as an encrypted attachment. The recipient is verified through OOB authentication utilizing the recipient's phone number before the attachment is decrypted and the recipient is provided access to the decrypted attachment. In the second aspect, the encrypted digital file may or may not be attached, but is stored by the system server in an encrypted format; after the OOB authentication, the system server decrypts the stored encrypted digital file and provides access to the decrypted digital file. The OOB authentication method is safer and easier for the recipient to use than a password. The email attachment security system is also easy for the sender to use, requiring only minimal input of information (the recipient's email address and phone number).

FIG. 1 illustrates a block diagram of the user experience of the first aspect of the email attachment security system and method using OOB authentication of the present invention. During use of the system, the sender 110 transmits, preferably through a secure connection, sender-provided electronic data 119 to the system server 190. (The system server 190 may include one or more receiving servers 120 or receiving applications running on the server 190). The system server 190 receives the sender-provided transmitted data 119, and performs one or more procedures using the sender-provided data 119 in accordance with the embodiments described herein. As used in this specification, the term "sender" should not be limited to a human, and can include a server or other types of devices (software and/or hardware) that can receive and/or transmit information.

The sender-provided data 119 includes at least the email address of the recipient 111, the phone number of the recipient 112, one or more recipient-specific digital files 115, and, optionally, may include the text for the email 117, the subject for the email 118, and/or administrative options, such as a request to time stamp the sent email 117 and/or the digital file 115, a length of time that the digital file is available for access by the recipient, and the like. The sender 110 also indicates that the email is to be sent to the recipient by executing a send request, which may be a direct instruction sent to the system server or may be done by completing steps that result in the sending of the email (such as providing a send date with a bulk data input method). The sender 110 can provide the sender-provided data 119 by using a network device, such as by using a browser to access an online web portal or by utilizing software or applications on a smart phone, tablet, desktop or other computing device, or through bulk data input into the system server. For example, the sender 110 could browse for the digital file 115 and upload it, the sender could open a digital file 115 in the email attachment security system 100 and designate the opened file as the digital file 115 to be provided to the sender, the sender 110 may provide multiple digital files 115 in a bulk set of sender-provided data 119 (such as bank statements, explanations of benefits, and the like with associated phone numbers and email addresses), or the sender 110 may use other optional means to provide the desired digital file 115 to be sent to the recipient as an encrypted attachment 215.

The email security system 100 includes one or more system servers 190 that operate the email attachment security system using OOB authentication. Though for discussion purposes the system server 190 is shown as separate servers 120, 125, 127, the server architecture can be varied as needed, such as for scaling or economic, technical, or business reasons. One or more of the servers 120, 125, 127 may be combined with another or multiple other servers or a single server or set of servers may provide the functionality of the separately discussed servers 120, 125, 127. In some embodiments, the system server 190 functionality can be implemented in hardware, using software, or using a combination of hardware and software. The receiving server 120, email server 125, and email service 145 are typically communicatively coupled between sender 110 and receiver 195. However, in some aspects, receiving server 120, email server 125, email service 145, and/or server 127 can be a part of, or be integrated with the sender 110.

After the system server 190 receives the sender-provided data 119, a unique email identifier is created and associated with a customized recipient-specific email 130 to be sent to the recipient via one or multiple encrypted and attached digital files 215) or, optionally, the unique email identifier may be associated with the digital file 115. The sender-provided data 119 is processed and the customized email 130, with headers containing a salt 231, an attachment message digest 232, and a reference ID 233 (including the unique email identifier 500 and additional data, in which the additional data can, for example, identify multiple attachments), is sent to the recipient's network device (typically a desktop computer, laptop computer, cellular phone, or other computing device configured to receive email).

Upon the request of the sender or the specifications of the email attachment security system, the email including the encrypted attachment or the encrypted attachment alone may be time-stamped using a trusted secure clock certified to be synchronized with an accepted time standard, such as a national time server. In the United States, the national time server is the National Institute of Standards and Technology (NIST), which is kept synchronized to the world standard of time maintained in Paris, France, which is the Coordinated Universal Time (UTC); thus the accepted time standard in the United States is referred to as the UTC-NIST standard. The time stamp and any associated data may be stored in the database, where they can be accessed by the sender and/or the recipient (such as through an administrative panel) or may be provided to the sender and/or recipient through other methods.

The body of the customized email 130 includes a clickable link 135 that opens a customized pickup webpage 136 and preferably establishes a secure connection. In the preferred aspects of the invention, the encrypted digital file/attachment 215 is attached as an encrypted email attachment to the customized email 130 for non-repudiation purposes. In another aspect, the encrypted digital file is not attached, but an encrypted digital file referral code is used, such as in the instance in which the encrypted file is too large to be accommodated by the email service of the recipient.

After the customized email 130 is received by the recipient 195, the recipient clicks on the link 135 (arrow 1 of FIG. 1), which takes him/her to the customized pickup webpage 136. At the customized pickup webpage 136, the recipient confirms his/her phone number (arrow 2) by inputting all or part of his/her phone number, which is the particular sequence of digits assigned to a particular telephone or telephony device that serves as an address for switching or routing telephone calls to the proper destination, which may be a land-line phone, mobile phone, or computing device receiving text or voice messages. Confirming the phone number may include requiring the recipient to input all of the digits of his/her phone number or may include presenting the recipient with a portion of his/her phone number with the recipient required to input the remaining digits.

At the customized pickup webpage 136, the recipient also preferably selects a contact option (the type of phone notification he/she prefers) by indicating a preference for an automated voice call or a text message. Based on the contact option chosen, the recipient receives a phone call (arrow 3A) or receives a text message (arrow 3B), which delivers an authentication PIN 150 to the recipient.

The recipient authentication PIN 150 is then entered by the recipient into an input box within the customized pickup webpage 136 (arrow 4). Upon receipt of the recipient authentication PIN 150, the server 190 unencrypts the encrypted attachment 215 and provides access for the recipient to the unencrypted attachment (arrow 5). The recipient is preferably allowed to download the unencrypted file/attachment 115. for his or her records.

Figure 2:
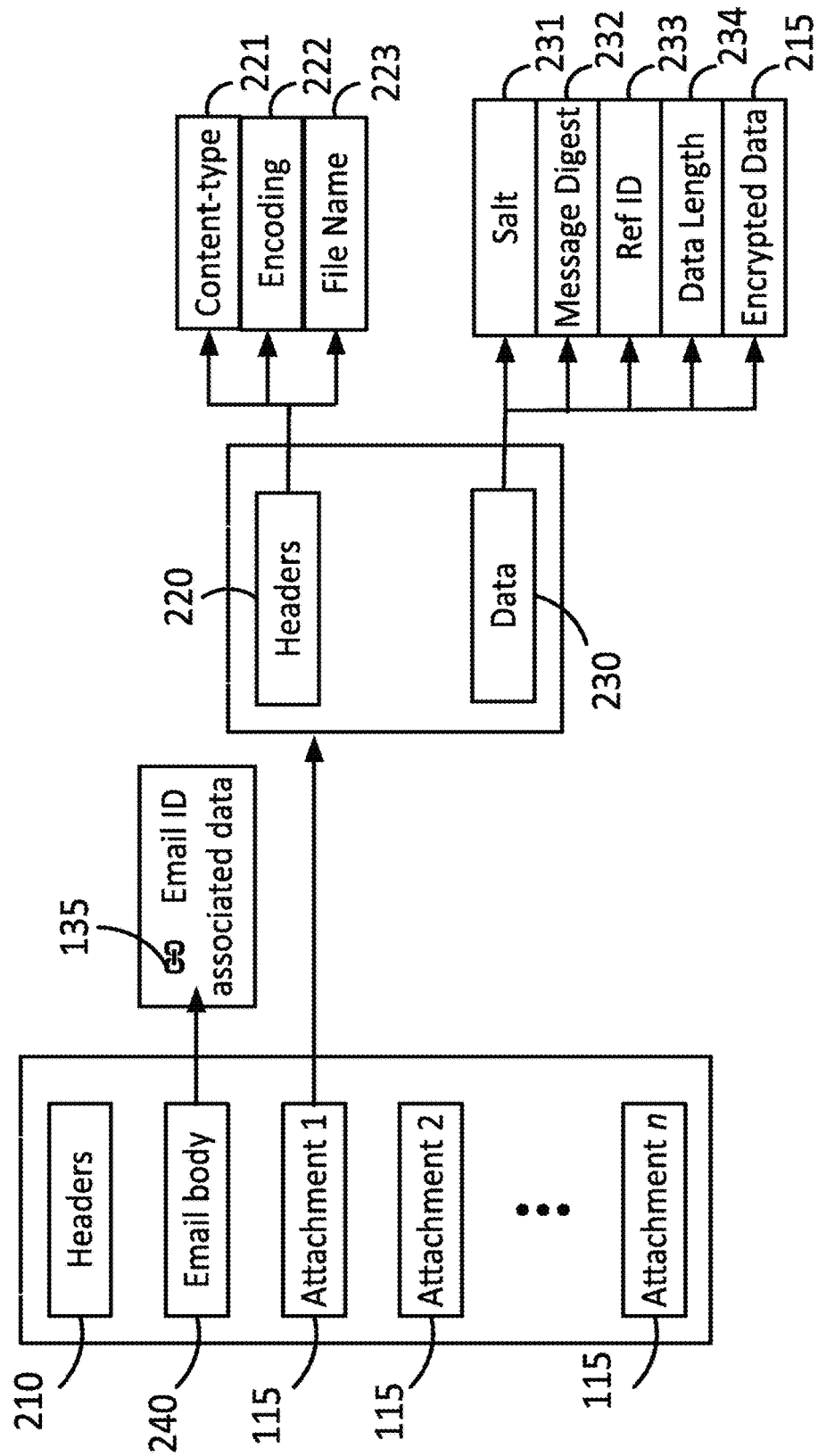
FIG. 2 is a block diagram illustrating the data format of the email attachment security system and method using out-of-band authentication of the present invention.

FIG. 2 is a block diagram of the data format of the secured email 130 of the email attachment security system 100. The secure email system is compliant with the standard email protocols, such as RFC-822. For example, the email headers 210 are the standard email headers. However, there are several differences.

(1.) The email body 240 contains a clickable link 135 that allows the recipient to interact with a web server 127 via a customized pickup webpage 136 through which the recipient is authenticated, the encrypted attachment 215 is decrypted and displayed to the recipient, and the decrypted digital file 115 is provided to the recipient for download.

(2.) The digital file or files 115 received from the sender are encrypted using a standard block cipher 450.

(3.) The encrypted file/attachment 215 is attached to the email 135. It has proprietary headers in addition to the normal headers (content type 221, encoding 222, and file name 223). The proprietary headers include the salt 231 (X-Trustifi-PlainText-Salt) used in the encryption, the attachment message digest 232 (X-Trustifi-PlainText-HashAlgo), the reference ID 233, the data length 234 (X-Trustifi=Attachment-Size), and the encrypted data 215. The salt 231, the attachment message digest 232, the reference ID 233, and the data length 234 are included for non-repudiation purposes. If the encrypted attachment 215 is too large, optionally, the encrypted digital file referral code may be substituted for the encrypted attachment as in the second aspect.

An exemplary MIME message that includes the standard headers and the proprietary headers follows:

```
Delivered-To: example@trustificorp.com
Received: by 10.76.90.138 with SMTP id bw10csp314722oab;
    Wed, 26 Aug 2015 07:42:18 -0700 (PDT)
Return-Path: <0000014f6a759e99-0eec4f51-6355-440c-808b-50444da479d6-
000000@amazonses.com>
Received: from a10-24.smtp-out.amazonses.com (a10-24.smtp-
out.amazonses.com. [54.240.10.24])
    by mx.google.com with ESMTPS id
136si38850368qhx.54.2015.08.26.07.42.18
    for <example@trustificorp.com>
    (version=TLSv1 cipher=ECDHE-RSA-RC4-SHA bits=128/128);
    Wed, 26 Aug 2015 07:42:18 -0700 (PDT)
From: "Example via Trustifi Staging Service"
<do_not_reply@staging.trustifi.com>
Sender: "Trustifi Staging Service" <do_not_reply@staging.trustifi.com>
Subject: BNYM Sample4c
To: "example@trustificorp.com" <example@trustificorp.com>
Reply-To: "Example" <example@example.ca>
X-TrustifiBlindPostmarkedEmailID: 201508D84ddiY-
6C0xXx1s6xhrDwVKc3JeBFozYhBh7wQhMk2c
X-TrustifiEmailTags: webcomposed_2015-08-26_14-42 dashboardwebcomposed
X-TrustifiArchiveForMonths: 3
MIME-Version: 1.0
Content-Type: multipart/signed; protocol="application/x-pkcs7-signature";
```

-continued

```
micalg="sha1"; boundary="----CEEDEDA278DAEB60A62BE8F1AAD46C48"
Date: Wed, 26 Aug 2015 14:42:17 +0000
Message-ID: <0000014f6a759e99-0eec4f51-6355-440c-808b-50444da479d6-
000000@example.com>
```

This is an S/MIME signed message

```
------CEEDEDA278DAEB60A62BE8F1AAD46C48
Content-Type: multipart/mixed;
boundary="=__4d35e0b0466fadcd0abddf25ac026516"
--=__4d35e0b0466fadcd0abddf25ac026516
Content-Type: multipart/alternative;
boundary="=__4d35e0b0466fadcd0abddf25ac026516.1"
--=__4d35e0b0466fadcd0abddf25ac026516.1
Content-Transfer-Encoding: quoted-printable
Content-Type: text/plain; charset=ISO-8859-1
plain text body
--=__4d35e0b0466fadcd0abddf25ac026516.1
Content-Transfer-Encoding: quoted-printable
Content-Type: text/html, charset=ISO-8859-1
html body
https://www.trustifi.com/pickupo
--=__4d35e0b0466fadcd0abddf25ac026516.1--
--=__4d35e0b0466fadcd0abddf25ac026516
Content-Type: application/x-trustifi-encrypted-aes256-cbc-sha256;
name="acme_invoice.pdf.enc"
Content-Transfer-Encoding: base64
Content-Disposition: attachment; filename="acme_invoice.pdf.enc"
Content-ID: <att0.4d35e0b0466fadcd0abddf25ac026516@staging.trustifi.com>
X-Trustifi-PlainText-Salt:
2b1f3f6b7ffeb88d9ab2e7581134b42c3bf1231c70e15a1cbe62ab97aa79ed05
X-Trustifi-PlainText-SHA256:
612cf2be3697ae808f8697be4b84d25f6dfdb4cf6fcfc65f9ae1b5377553e937
X-Trustifi-Attachment-Ref:
201508DpW0XBDXqhpwrrVhiat1Afr7SKhmecWFEySlLpa-
2Uj0:158933_1440603229612-att-0
X-Trustifi-Attachment-Size: 12378
j8SfKZTOsZ7/jbB3ySS2rBm2H.... base64 encoded encrypted attachment data
--=__4d35e0b0466fadcd0abddf25ac026516--
------CEEDEDA278DAEB60A62BE8F1AAD46C48
Content-Type: application/x-pkcs7-signature; name="EmailDigitalSignature.p7s"
Content-Transfer-Encoding: base64
Content-Disposition: attachment; filename="EmailDigitalSignature.p7s"
MIITnQYJKo...
------CEEDEDA278DAEB60A62BE8F1AAD46C48--
```

Figure 3:
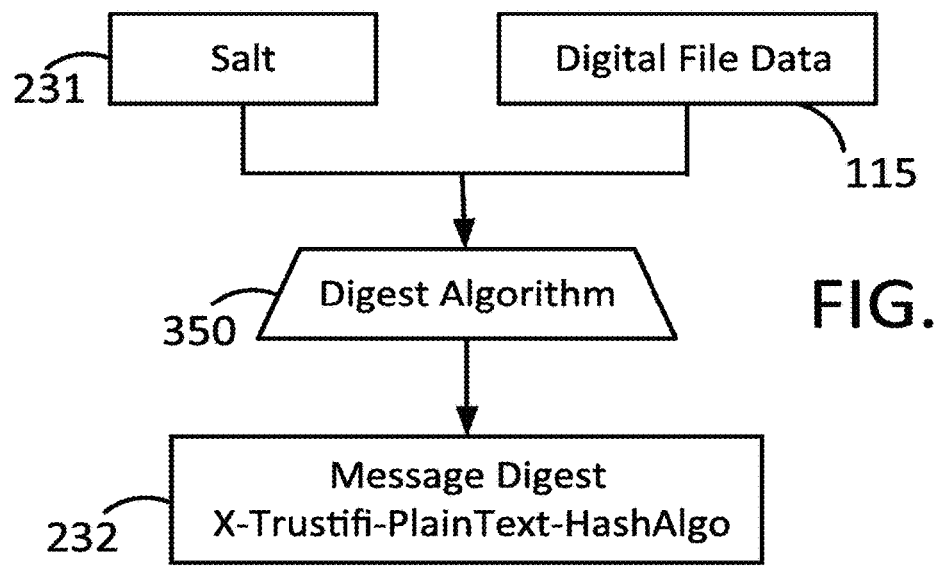
FIG. 3 is a block diagram illustrating the creation of the message digest attachment header, X-Trustifi-PlainText-HashAlgo.

FIG. 3 is a block diagram illustrating the computation of the attachment message digest 232. The message digest 232 is used for non-repudiation, which necessitates a direct chain of evidence from the receipt of the original digital file 115, through the encryption 450 (FIG. 4) of the digital file 115 to produce the encrypted file/attachment 215, through the sent email 130, and to the decryption of the encrypted attachment 215 to provide the original unencrypted digital file/attachment 115 to the recipient. To do this, the email attachment security system using OOB authentication 100 adds a salt 231 to the digital file 115 prior to using a message digest algorithm 350 to obtain the attachment message digest 232. Adding a salt prior to computing the message digest 232 allows for non-repudiation even if the encryption/decryption key is lost.

Figure 4:
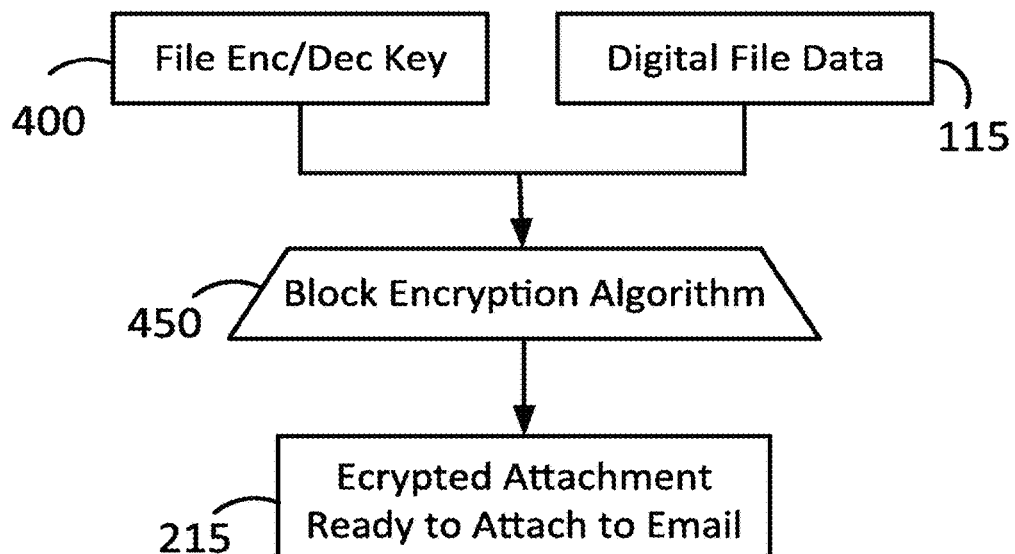
FIG. 4 is a block diagram illustrating the encrypting of a digital file to be used as an attachment using a file encryption/decryption key.

FIG. 4 is a block diagram showing the steps in encrypting the digital file data 115. The digital file 115 is encrypted with the file/attachment encryption/decryption key 400 by using a block encryption algorithm 450. This encryption produces the encrypted file 215 that is ready to attach to the email 130. A standard encryption protocol, such as AES-256 in CBC mode, is used for the block encryption algorithm 450. The standard block cipher is described in the publication Recommendations for Block Cipher Modes of Operation, NIST Special Publication 800-38A, and hash functions are described in the publication Recommendation for Applications Using Approved Hash Functions, NIST Special Publication 800-107, which are incorporated herein in their entirety. The block encryption algorithms 450 utilized to encrypt various data by the email attachment security system using OOB authentication of the present invention 100 may be identical block encryption algorithms 450 (a first block encryption algorithm for encrypting first data is identical to the second block encryption algorithm for encrypting second date and is identical to a third block encryption algorithm for encrypting third data) or one or more standard variations of block encryption algorithms 450 (a first block encryption algorithm for encrypting first data may be different than the second block encryption algorithm used for encrypting second date, etc.); standard variations are described in the NIST publications and may be used to encrypt the variety of data types.

In the first aspect, when the recipient has received the email with an encrypted attachment and has been authenticated, the encrypted attachment 215 is decrypted by reversing the order of the steps in FIG. 4 to provide the recipient with the unencrypted original file 115, which is preferably available for the recipient to download.

In the second aspect, in the case in which the recipient has received the email without an encrypted attachment, but with an encrypted digital file referral code, when the recipient has been authenticated, the system server unencrypts the database data to display the unencrypted original file 115 at the customized pickup webpage, which is available for the recipient to download.

The file or attachment encryption/decryption key 400 is preferably created by using the recipient's phone number 112 and the unique email ID 500. However, it may be created by other creation methods, such as by utilizing the recipient's email address and the unique email ID, utilizing the recipient's email address and phone number, utilizing a randomly generated number or the like; in these cases, the newly created encrypted digital file referral code would then be associated with the recipient's phone number and/or the unique email ID.

Figure 5:
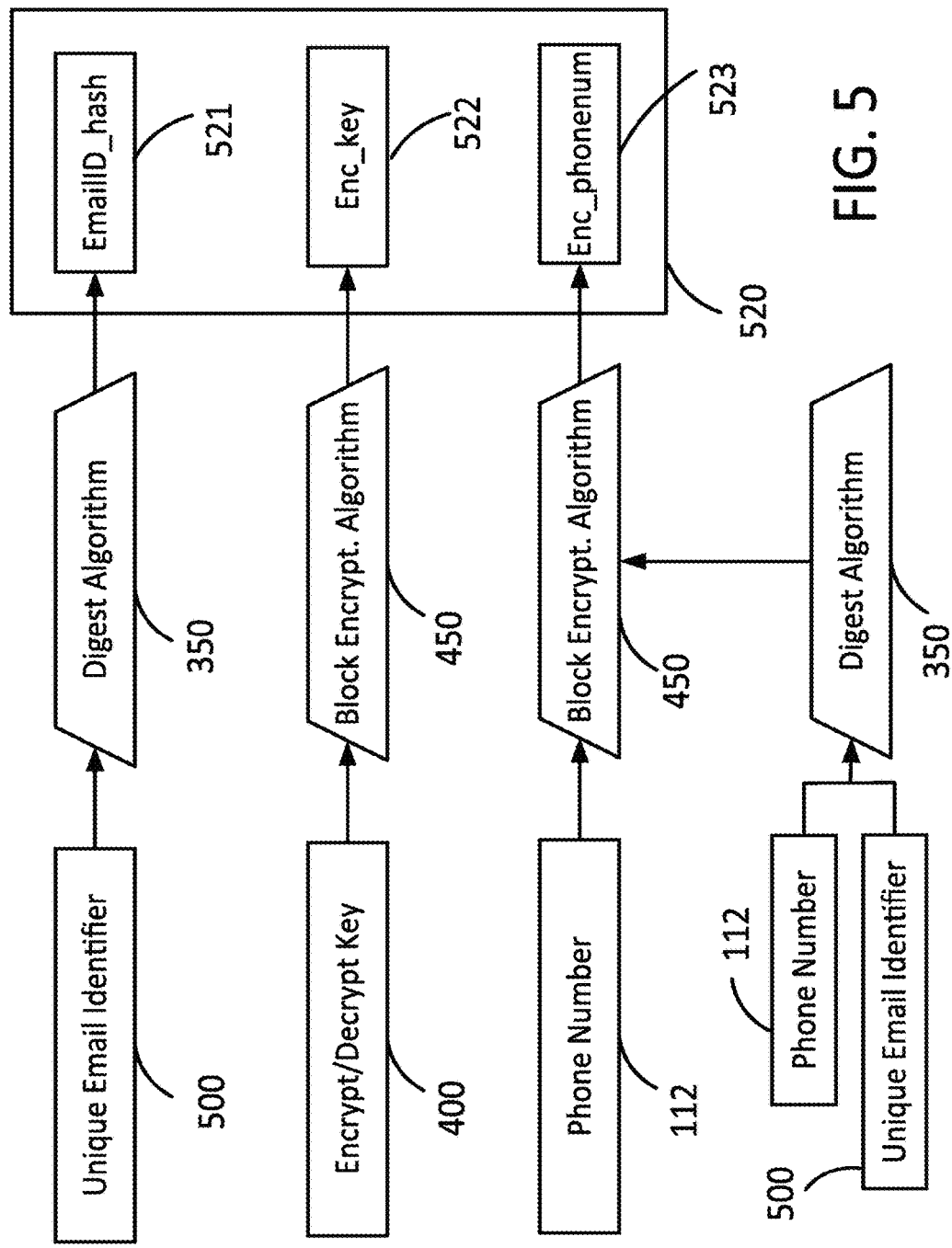
FIG. 5 is a block diagram illustrating the encrypting and hashing performed to store the unique email identifier, the encryption/decryption key, and the phone number as database table values in the database.

FIG. 5 is a block diagram showing the hashing and encrypting performed by the system server before the stored data 520 are stored, thereby preventing a data breach. As shown, the unique email identifier 500 is hashed with a message digest algorithm 350 to produce an EmailID_hash value 521 that is stored in the database. The file/attachment encryption/decryption key 400 is encrypted using a block encryption algorithm 450, as described above, to produce an Enc_key value 522 that is stored in the database. A message digest is computed from the recipient's phone number 112 and the unique email identifier 500 by a message digest algorithm 350; this message digest and the recipient's phone number 112 are encrypted using a block encryption algorithm 450 to generate an Enc_phonenum value 523 that is stored in the system database. (The message digest algorithms 350 used by the system server may be identical or may vary; for example, a first message digest algorithm may be identical or non-identical to a second and/or third message digest algorithm used.) These stored data 520 cannot be accessed without first knowing the correct unique email identifier.

In summary, by going to a website provided by the email attachment security system of the present invention, by using installed software, by using a mobile application, or by using a bulk data input method, a sender can have a file or attachment by email sent to a recipient in a safe and secure manner. The recipient can easily retrieve the encrypted attachment by clicking a link in the received email to go to a customized pickup webpage. The provided OOB authentication method is used to obtain a verification code that, when entered into the customized website, causes the decryption of the encrypted attachment for the recipient in the first aspect of the invention or causes the decryption of the stored encrypted digital file in the second aspect of the invention. The OOB authentication system proves that the recipient has access to the recipient email, knows the sender-provided recipient phone number, and is in control of the recipient phone. Once the recipient has been authenticated, the authentication may be remembered for a pre-determined authentication session time, such as, for example, a day, a week, or a month, thereby eliminating the need for the recipient to re-authenticate during this pre-determined authentication session time.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An email security system, comprising:
at least one system server, wherein said system server comprises at least one hardware processor, at least one database, and a memory operatively coupled to said processor, said memory storing program instructions that when executed by said processor, cause said at least one hardware processor to:
receive from a sender: digital file data, a recipient phone number, and a recipient email address;
compute an attachment message digest from a salt and said digital file data;
create a unique email identifier associated with said email attachment or a customized email to be sent to said recipient;
compute an email identifier_hash value from said unique email identifier;
create a file encryption/decryption key;
encrypt said file encryption/decryption key to create encryption key value;
compute a phone number message digest;
encrypt said phone number and said phone number message digest to create an encrypted phone number value;
store in said database said email identifier hash value, said encryption key value, and said encrypted phone number value;
encrypt said digital file data to create an encrypted attachment based on said file encryption/decryption key;
send said customized email to said recipient email address, said customized email comprising a link to a customized pickup webpage and comprising said encrypted attachment, wherein said link comprises data associated with said unique email identifier;
receive said data associated with said unique email identifier based on user selection of said link;
cause display of said customized pickup webpage upon receipt of said data associated with said unique email identifier, wherein said pickup webpage enables user input of at least a portion of said recipient phone number;
receive the at least a portion of said recipient phone number via the customized pickup webpage;
cause transmission, to said recipient phone number, of a text message or a voice call that communicates a recipient authentication PIN, wherein said pickup webpage further enables user input of an entered PIN;
determine that said entered PIN matches said recipient authentication PIN;
in response to a determination that said entered PIN matches said recipient authentication PIN, decrypt said encrypted attachment to create a decrypted attachment by using said encryption key value associated with said file encryption/decryption key; and
provide access to said decrypted attachment.

2. The email security system of claim 1, wherein said customized email comprises headers that comprise said salt, said attachment message digest, and a reference ID.

3. The email security system of claim 1, wherein said phone number message digest is computed from said recipient phone number and said unique email identifier.

4. The email security system of claim 1, wherein said program instructions, when executed by said processor, further cause said processor to associate said data associated with said unique email identifier with said unique email identifier.

5. The email security system of claim 1, wherein:
said customized email comprises headers that comprise said salt, said attachment message digest, and a reference ID;
said phone number message digest is computed from said recipient phone number and said unique email identifier; and
said program instructions, when executed by said at least one hardware processor, further cause said at least one hardware processor to associate said data associated with said unique email identifier with said unique email identifier.

6. The email security system of claim 1, wherein said program instructions, when executed by said at least one hardware processor, further cause said at least one hardware processor to create a predetermined authentication session time during which the email security system does not require said recipient to re-authenticate.

7. The email security system of claim 1, wherein said program instructions, when executed by said at least one hardware processor, further cause said at least one hardware processor to utilize a trusted secure clock synchronized with an accepted time standard to time-stamp said customized email.

8. A computer-implemented method comprising:
receiving, from a first computing device associated with a sender, at least:
a digital file provided by the sender for delivery to a particular recipient identified by the sender, an email address of said particular recipient, and a phone number associated with said particular recipient;
encrypting said digital file to create an encrypted digital file;
sending an email to the email address of said particular recipient, wherein said email comprises a link to a customized pickup webpage associated with the encrypted digital file;
receiving, from a second computing device, a request for said customized pickup webpage;
in response to receiving the request for said customized pickup webpage, requesting entry, by a user of the second computing device, of at least a portion of said phone number associated with said particular recipient;
receiving from the second computing device, user input of the at least a portion of said phone number associated with said particular recipient;
causing transmission of an authentication personal identification number (PIN) to said phone number associated with said particular recipient via a voice message or text message;
receiving, from the second computing device, an entered personal identification number (PIN);
authenticating said particular recipient based at least in part on a determination that the entered PIN matches the authentication PIN;
decrypting said encrypted digital file to create a decrypted digital file; and
providing the second computing device with access to said decrypted digital file.

9. The computer-implemented method of claim 8, wherein said email comprises said encrypted digital file.

10. The computer-implemented method of claim 8, further comprising establishing a secure communication channel between said second computing device and a system server.

11. The computer-implemented method of claim 8, further comprising receiving a time-stamp request to be provided in association with a trusted secure clock certified to be synchronized with an accepted time standard.

12. The computer-implemented method of claim 8, wherein receipt of said time-stamp request actuates said time stamping of said email including said digital file.

13. The computer-implemented method of claim 8, wherein encrypting said digital file to create an encrypted digital file comprises creating a file encryption/decryption key and encrypting said digital file data to create an encrypted attachment by use of said file encryption/decryption key and a block encryption algorithm.

14. The computer-implemented method of claim 8, wherein said email does not include the digital file and does not include the encrypted digital file, wherein said encrypted digital file is retrieved from a server for decryption in response to authenticating said particular recipient.

* * * * *